(12) United States Patent
Beiser et al.

(10) Patent No.: US 12,115,922 B2
(45) Date of Patent: Oct. 15, 2024

(54) VEHICLE IDENTITY ACCESS MANAGEMENT

(71) Applicant: FORD GLOBAL TECHNOLOGIES, LLC, Dearborn, MI (US)

(72) Inventors: Joseph Carl Beiser, Northville, MI (US); John Correia, Berkely, MI (US); James Wilhelm Heaton, Ann Arbor, MI (US); Arthur Marius Vitui, Brossard (CA); Praveen Kumar Yalavarty, Novi, MI (US); Venkata Maruthe Ravikumara Sharma Chengalvala, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/111,982

(22) Filed: Feb. 21, 2023

(65) Prior Publication Data
US 2023/0202413 A1      Jun. 29, 2023

Related U.S. Application Data

(62) Division of application No. 16/406,615, filed on May 8, 2019, now Pat. No. 11,613,217.

(51) Int. Cl.
*B60L 53/66* (2019.01)
*B60R 16/037* (2006.01)
(Continued)

(52) U.S. Cl.
CPC .......... *B60R 16/037* (2013.01); *B60L 53/665* (2019.02); *B60R 25/252* (2013.01);
(Continued)

(58) Field of Classification Search
CPC ... B60R 16/037; B60R 25/252; B60L 53/665; G06Q 20/405; G06Q 50/06; H04W 4/40
See application file for complete search history.

(56) References Cited

U.S. PATENT DOCUMENTS

| 2010/0145850 A1* | 6/2010 | Nagai | G06Q 20/349 |
| | | | 705/41 |
| 2011/0137520 A1 | 6/2011 | Rector et al. | |

(Continued)

FOREIGN PATENT DOCUMENTS

WO     2016005289 A1     1/2016

OTHER PUBLICATIONS

EZ Pass available at https://www.ezpassva.com/ and https://www.ezpassva.com/Discount/DiscountInfo.aspx (2017) i.e., attached p. 1 (EZ) (Year: 2017).

(Continued)

*Primary Examiner* — Kenneth J Malkowski
(74) *Attorney, Agent, or Firm* — Joseph Zane; Brooks Kushman P.C.

(57) ABSTRACT

A vehicle includes a controller, programmed to responsive to identifying a first user via a mobile device, load a first non-person entity associated with the first user from the mobile device to configure vehicle settings, the first non-person entity including a driver setting, a first entertainment setting and a second entertainment setting; and responsive to identifying a second user entering the vehicle, switch from the first entertainment setting to a second entertainment setting.

6 Claims, 12 Drawing Sheets

(51) Int. Cl.
*B60R 25/25* (2013.01)
*G06Q 20/40* (2012.01)
*G06Q 50/06* (2012.01)
*H04W 4/40* (2018.01)

(52) U.S. Cl.
CPC ........... *G06Q 20/405* (2013.01); *G06Q 50/06* (2013.01); *H04W 4/40* (2018.02)

(56) References Cited

U.S. PATENT DOCUMENTS

| | | |
|---|---|---|
| 2014/0309866 A1 | 10/2014 | Ricci |
| 2014/0309879 A1 | 10/2014 | Ricci |
| 2015/0197205 A1 | 7/2015 | Xiong et al. |
| 2016/0167608 A1 | 6/2016 | Rai |
| 2016/0185358 A1 | 6/2016 | Todasco et al. |
| 2018/0018591 A1 | 1/2018 | Shiraishi et al. |
| 2019/0199800 A1 | 6/2019 | Penilla et al. |
| 2019/0378220 A1* | 12/2019 | Ibrahim ............. G06Q 20/3224 |
| 2020/0068400 A1 | 2/2020 | Ramic et al. |
| 2022/0180352 A1* | 6/2022 | Shin .................. G06Q 20/3278 |

OTHER PUBLICATIONS

Harman International Industries Incorporated, "Cloud-based Driver Profile Service," http://harmanconnected.services/cloud-based-profile, 2 Pages.

\* cited by examiner

VEHICLE IDENTITY ACCESS MANAGEMENT

CROSS-REFERENCE TO RELATED APPLICATIONS

This application is a division of U.S. application Ser. No. 16/406,615 filed May 8, 2019, the disclosure of which is hereby incorporated in its entirety by reference herein.

TECHNICAL FIELD

The present disclosure generally relates to vehicle identity access management (TAM). More specifically, the present disclosure relates to a vehicle TAM system using a personal entity.

BACKGROUND

Many vehicle consumers use connected features. Currently, most features are vehicle-centric, e.g. a user may configure seat, radio settings on a specific vehicle, and those settings are not carried over when the user changes the vehicle. In addition, when a vehicle has multiple users (e.g. husband and wife), one user may prefer to share some profiles with the other user while keeping the rest of the profiles private. For instance, the husband may want to share his satellite radio subscription with his wife, but keep his seat and air-conditioning (AC) settings separate. Under the current vehicle-centric model, this may be difficult to achieve.

SUMMARY

In one or more illustrative embodiment of the present disclosure, a vehicle includes a controller, programmed to responsive to identifying a first user via a mobile device, load a first non-person entity (NPE) associated with the first user from the mobile device to configure vehicle settings, the first NPE including a driver setting, a first entertainment setting and a second entertainment setting; and responsive to identifying a second user entering the vehicle, switch from the first entertainment setting to a second entertainment setting.

In one or more illustrative embodiment of the present disclosure, a vehicle includes a controller, programmed to responsive to receiving a request for payment option from a fueling station, search for a payment profile associated with a current vehicle user; responsive to detecting a payment profile, verify if the payment profile includes a purchase category covering the fueling station; and responsive to verifying the fueling station is covered, send a request for payment authorization to a cloud server.

In one or more illustrative embodiment of the present disclosure, a method for a vehicle includes receiving a configuration for the vehicle associated with a first user including a driver setting from a cloud server; responsive to detecting a first mobile device of the first user has entered the vehicle, applying the driver setting to the vehicle; responsive to detecting a second mobile device of a second user has entered the vehicle, loading an entertainment setting of the second user from the second mobile device; and applying the entertainment setting to the vehicle without updating the driver setting.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes a vehicle IAM system. More specifically, the present disclosure proposes a vehicle IAM system utilizing user entities and vehicle entities.

Figure 1:
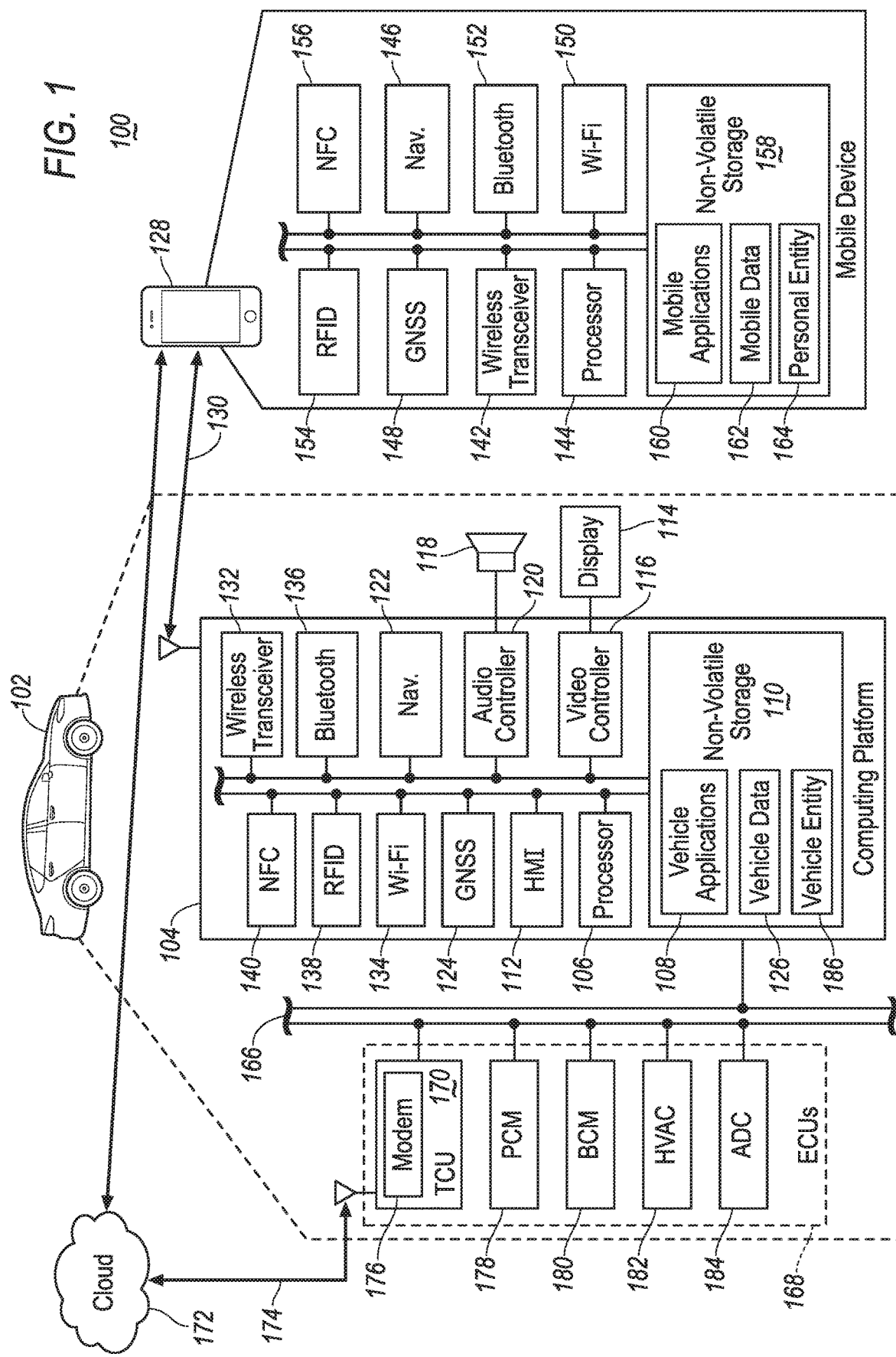
FIG. 1 illustrates an example block topology of a vehicle system of one embodiment of the present disclosure.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be battery electric vehicle (BEV), a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Michigan. It should be noted that the illustrated system 100 is merely an example, and more, fewer, and/or differently located elements may be used.

As illustrated in FIG. 1, a computing platform 104 may include one or more processors 106 configured to perform instructions, commands, and other routines in support of the processes described herein. For instance, the computing platform 104 may be configured to execute instructions of vehicle applications 108 to provide features such as navigation, IAM, and wireless communications. Such instructions and other data may be maintained in a non-volatile manner using a variety of types of computer-readable storage medium 110. The computer-readable medium 110 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 112 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 114 configured to provide visual output to vehicle occupants by way of a video controller 116. In some cases, the display 114 may be a touch screen further configured to receive user touch input via the video controller 116, while in other cases the display 114 may be a display only, without touch input capabilities. The computing platform 104 may also drive or otherwise communicate with one or more speakers 118 configured to provide audio output to vehicle occupants by way of an audio controller 120.

The computing platform 104 may also be provided with navigation and route planning features through a navigation controller 122 configured to calculate navigation routes responsive to user input via e.g., the HMI controls 112, and output planned routes and instructions via the speaker 118 and the display 114. Location data that is needed for navigation may be collected from a global navigation satellite system (GNSS) controller 124 configured to communicate with multiple satellites and calculate the location of the vehicle 102. The GNSS controller 124 may be configured to support various current and/or future global or regional location systems such as global positioning system (GPS), Galileo, Beidou, Global Navigation Satellite System (GLONASS) and the like. Map data used for route planning may be stored in the storage 110 as a part of the vehicle data 126. Navigation software may be stored in the storage 110 as a part of the vehicle applications 108.

The computing platform 104 may be configured to wirelessly communicate with a mobile device 128 of the vehicle users/occupants via a wireless connection 130. The mobile device 128 may be any of various types of portable computing device, such as cellular phones, tablet computers, wearable devices, smart watches, laptop computers, portable music players, or other device capable of communication with the computing platform 104. A wireless transceiver 132 may be in communication with a Wi-Fi controller 134, a Bluetooth controller 136, a radio-frequency identification (RFID) controller 138, a near-field communication (NFC) controller 140, and other controllers such as a Zigbee transceiver, an IrDA transceiver (not shown), and configured to communicate with a compatible wireless transceiver 142 of the mobile device 128.

The mobile device 128 may be provided with a processor 144 configured to perform instructions, commands, and other routines in support of the processes such as navigation, telephone, wireless communication, and multi-media processing. For instance, the mobile device 128 may be provided with location and navigation functions via a navigation controller 146 and a GNSS controller 148. The mobile device 128 may be provided with a wireless transceiver 142 in communication with a Wi-Fi controller 150, a Bluetooth controller 152, a RFID controller 154, an NFC controller 156, and other controllers (not shown), configured to communicate with the wireless transceiver 132 of the computing platform 104. The mobile device 128 may be further provided with a non-volatile storage 158 to store various mobile application 160 and mobile data 162. The storage 158 may be further configured to store a personal entity 164 (to be described in detail below) associated with a user of the mobile device 128.

The computing platform 104 may be further configured to communicate with various components of the vehicle 102 via one or more in-vehicle network 166. The in-vehicle network 166 may include, but is not limited to, one or more of a controller area network (CAN), an Ethernet network, and a media-oriented system transport (MOST), as some examples.

The computing platform 104 may be configured to communicate with various ECUs 168 of the vehicle 102 configured to perform various options. For instance, the computing platform may be configured to communicate with a TCU 170 configured to control telecommunication between vehicle 102 and a cloud 172 through a wireless connection 174 using a modem 176. The wireless connection 174 may be in the form of various communication network e.g. a cellular network. The term cloud is used as a general term in the present disclosure and may include any computing network involving computers, servers, controllers or the like configured to store data and perform data processing functions and facilitate communication between various entities.

The ECUs 168 may further include a powertrain control module (PCM) 178 configured to monitor and control powertrain settings of the vehicle 102. For instance, the PCM 178 may be configured to control operation of the stop/start of an engine (not shown), and/or the driving mode (e.g. economic, normal, or sport) of the vehicle 102. The ECUs 168 may further include a body control module (BCM) 180 configured to monitor and control body operations of the vehicle 102. For instance, the BCM 180 may be configured to control and monitor body functions such as door lock/unlock, seatbelt warning, vehicle occupancy, blind spot monitoring or the like using signals detected via one or more sensors (not shown). The ECUs 168 may further include a heating ventilation and air conditioning (HVAC) controller 182 configured to operate a climate control system for the interior of the vehicle 102. The ECUs 168 may further include an autonomous driving controller (ADC) 184 configured to monitor and control the autonomous driving features of the vehicle 102. Some autonomous driving feature may include lane keep assist, safe distance from other vehicles, cruise control, hands-off-wheel alert, autobraking, brake mitigation with multiple sensitivity levels or the like. Setting and configurations of the various ECUs 168 may be stored in the storage 110 as a vehicle entity 186.

Figure 2:
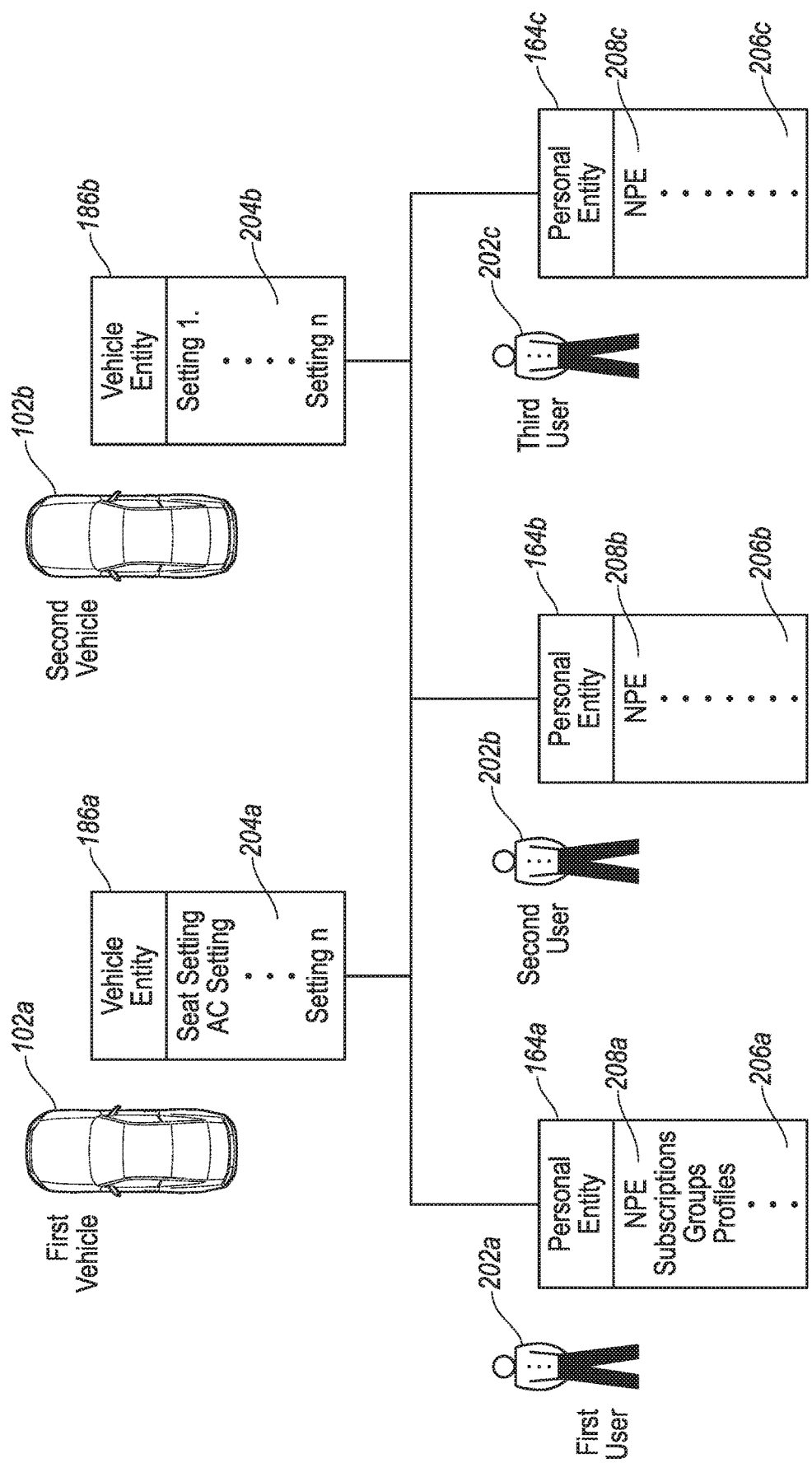
FIG. 2 illustrates an example schematic diagram of one embodiment of the present disclosure.

Referring to FIG. 2, a schematic diagram 200 of one embodiment of the present disclosure is illustrated. With continuing reference to FIG. 1, in the present example, two vehicles 102 are associated with three users 202. The present example may be applied to a family of three having two vehicles. A first user 202a (e.g. the husband) may be the owner of both vehicles 102a, 102b and the primary driver of the first vehicle 102a (e.g. a sedan). A second user 202b (e.g. the wife) may be the primary driver of the second vehicle 102b (e.g. a mini-van). A third user 202c (e.g. the child) may be the rider of both vehicles 102a, 102b. Although both vehicles 102 are owned by the first user 202a in the present example, it is noted that vehicle ownership may be shared with multiple users of the same group (to be described below). As discussed previously with reference to FIG. 1, each vehicle 102 may be associated with a vehicle entity 186 having various entries 204. The first vehicle 102a may be associated with a first vehicle entity 186a having entries 204a. As a few non-limiting examples, the entries 204a may include various settings and configuration of the first vehicle 102a such as seat setting, air-conditioning (AC) setting or the like. The second vehicle 102b may be associated with a second vehicle entity 186b having various entries 204b.

Similar to the vehicles 102, each user 202 may be associated with a personal entity 164 stored in the mobile device used by each specific user 202. For instance, the first user 202a may have a first personal entity 164a associated with various entries 206a. The entries 206 may also be referred to as NPEs 208a configured to record properties of various settings. For instance, the NPEs may include subscriptions, groups, profiles or the like as a few non-limiting examples. Similarly, the second user 202b and the third user 202c may each have a second personal entity 164b, 164c associated with entries 206b, 206c (NPEs 208b, 208c) respectively. Additionally or alternatively, the personal entity 164 may be primarily stored in the cloud 172 and shared with the mobile device 128 and the computing platform 104. The mobile device 128 and the computing platform 104 may store a copy of the personal entity 164 and attributes for a given time before a synchronization with the cloud 172 occurs.

Figure 3:
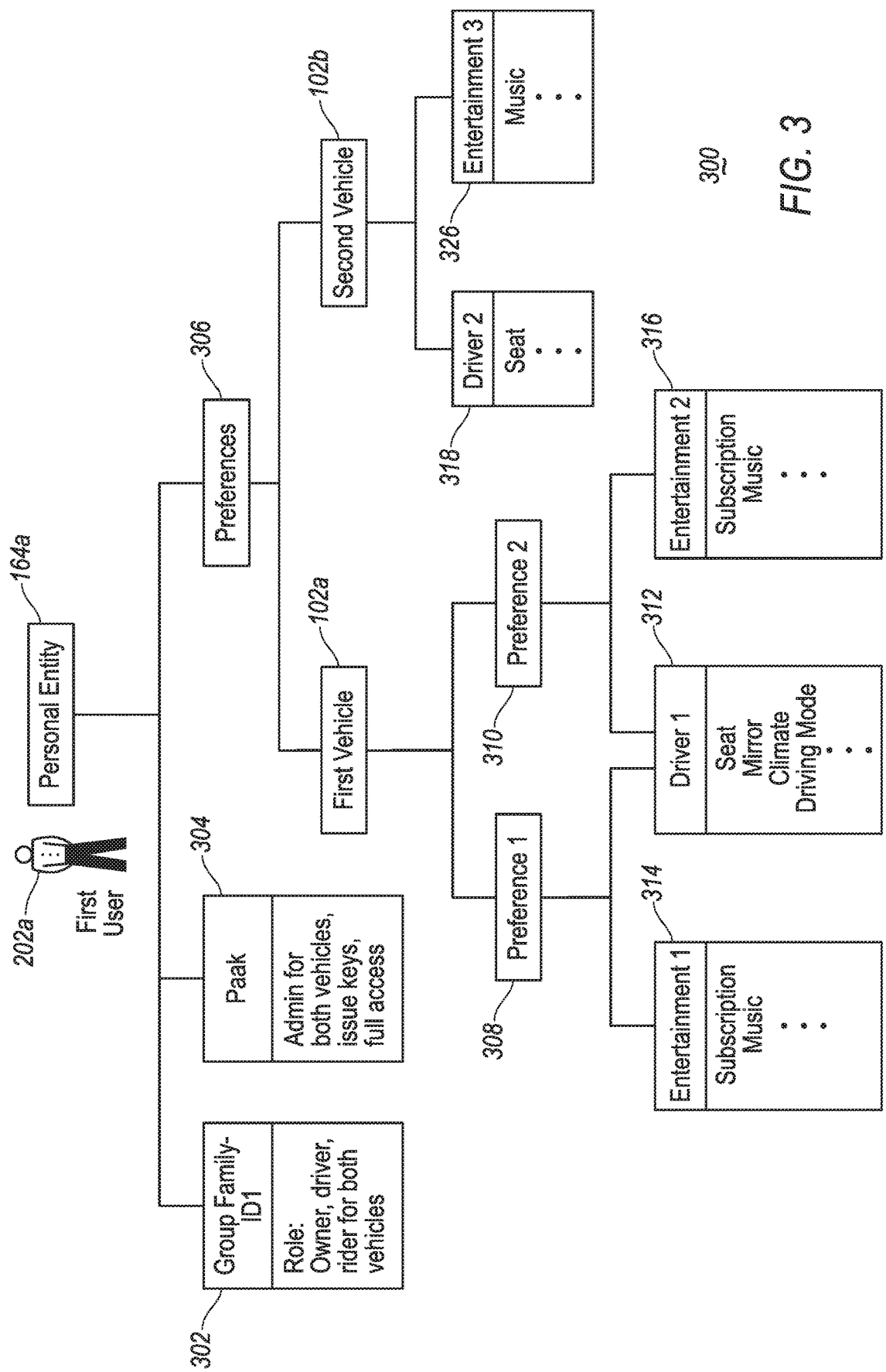
FIG. 3 illustrates a first example diagram for personal entity of one embodiment of the present disclosure.

Referring to FIG. 3, an example diagram 300 for a personal entity of one embodiment of the present disclosure is illustrated. With continuing reference to FIGS. 1 and 2, the personal entity 164a of the first user 202a may be associated with various entries. Continuing with the above family of three example, the personal entity 164a may be associated with a group entry 302, which in this case may be assigned with an identifier of Group Family—ID1 for instance. All of the three family members 202 may be in this group, although each user may be a member of other different groups. The group entry 302 may further indicate the role of the first user 202a. There are various roles to be assigned to each user. For instance, the roles may include an owner—having the highest authority to control and access a vehicle, a driver—having intermediate authorization to fully access a vehicle, and a rider—having the lowest authorization with limited access to a vehicle. In the present example, the first user 202a, as the owner of both vehicles 102, may be assigned the roles of owner, driver, rider for both vehicles 102. The personal entity 164a may be further associated with a phone-as-a-key (PaaK) entry 304 configured to authorize digital access of vehicles 102. As the owner of both vehicles 102, the first user maybe assigned with an administer PaaK allowing the first user 202a to issue/authorize keys to other users to access both vehicles 102.

The personal entity 164a may be further associated with various preference entries 306 for the first user 202a. The preferences 306 may be further divided by each of the two vehicles 102 separately. For the first vehicle 102a, the first user 202a may have two preferences, each associated with one or more driver preference and entertainment preference separately or collectively. For instance, the user 202a may have a first preference 308 and a second preference 310. The first preference 308 may be associated with a first driver preference 312 and a first entertainment preference 314, and the second preference 310 may be associated with the same first driver preference 312 and a second entertainment preference 316. In this example, the first preference 308 and the second preference 310 share the same driver preferences 312 such as seat setting, mirror setting, climate setting, driving mode setting or the like. The first preference 308 and the second preference 310 may be associated with different entertainment preferences 314 and 316 including subscription, music, radio settings or the like. For the second vehicle 102b, the first user 202a may have only one preference as he is not the primary driver of the vehicle 102b. The preference may include a second driver preference 318 and a third entertainment preference 320.

Figure 4:
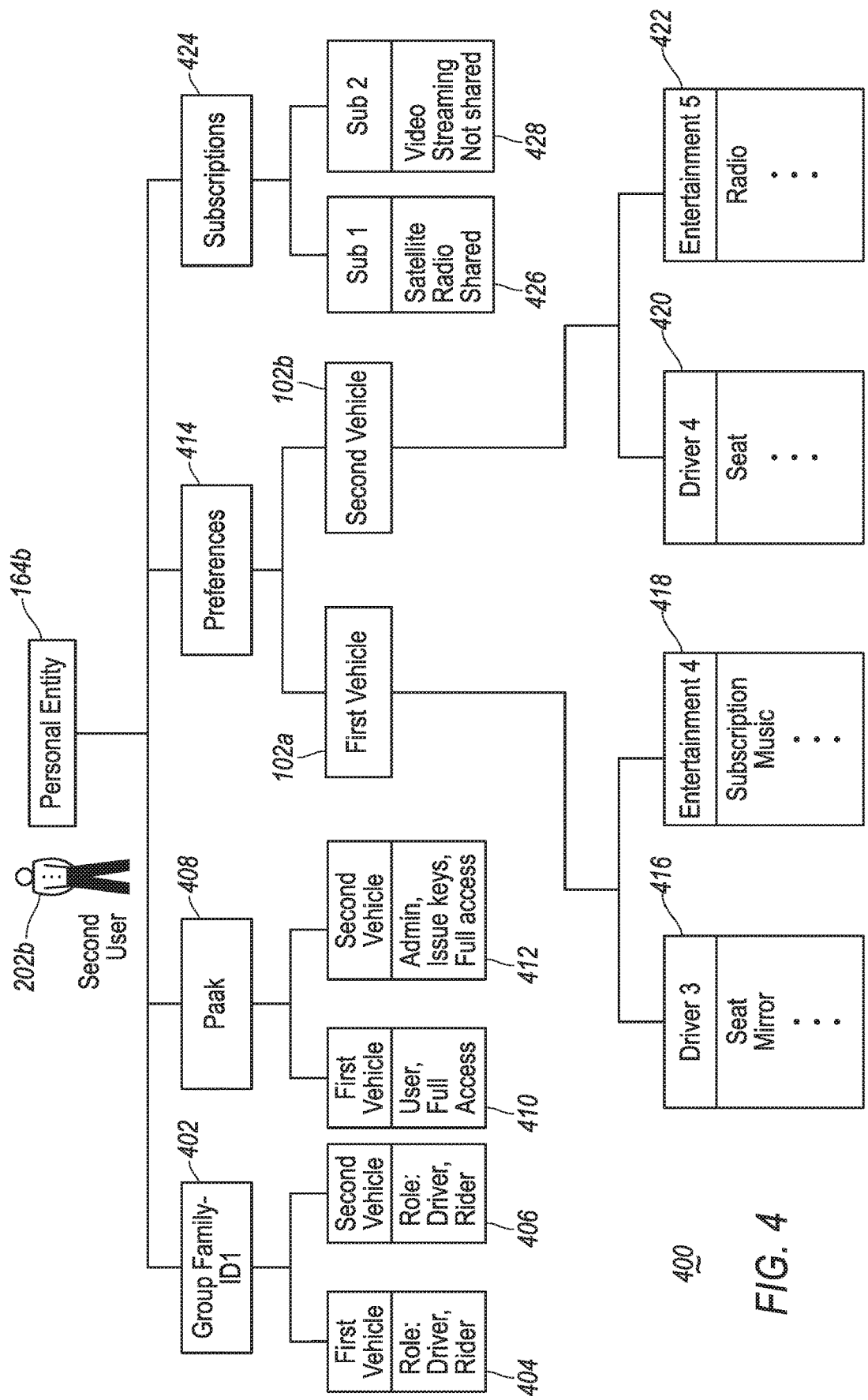
FIG. 4 illustrates a second example diagram for personal entity of one embodiment of the present disclosure.

Referring to FIG. 4, an example diagram 400 for a second personal entity of one embodiment of the present disclosure is illustrated. With continuing reference to FIGS. 1-3, the personal entity 164b of the second user 202b may be associated with various entries. The personal entity 164b may be associated with a group entry 402 indicating Group Family—ID1, the same as the first user 202a. Group Family—ID1 is associated with two vehicles 102. In the present example, the role 404 for the second user is driver and rider for the first vehicle 102a. For the second vehicle 102b, the role 406 for the second user is driver and rider. It is noted that one user's role may vary from vehicle to vehicle. In some groups (not shown), the same user may the owner of one vehicle, but only a rider for another vehicle. The personal entity 164b may be further associated with a PaaK entry 408 associated with both vehicles 102. For the first vehicle 102a, the second user 202b may be a user 410 for the PaaK feature and is allowed to receive keys but not to issue keys. For the second vehicle 102b, the second user 202b may be an administrator and is allowed to issue keys to other users.

The personal entity 164b may be further associated with various preference entries 414 for the second user 202b. The preferences 414 may be further divided by each of the two vehicles 102 separately. For the first vehicle 102*a*, the second user 202*b* may have a third driver preference 416 and a fourth entertainment preference 418. As discussed previously, the driver preference may include settings for seat, mirror, driving mode, whereas the entertainment preference may include settings for music, subscription or the like. The second user 202*b* may have a fourth driver preference 420 and a fifth entertainment preference 422 for the second vehicle 102*b*. The personal entity 164*b* may be further associated with an entry for subscriptions 424 of the second user. For instance, the subscription entry may include a first subscription for satellite radio 426. The first subscription for satellite radio 426 may be set to be shared with other members of the Group Family—ID1. The subscription entry 424 may further include a second subscription for video streaming 428 which is not shared with any other users without the presence of the second user 202*b* in the same vehicle.

Figure 5:
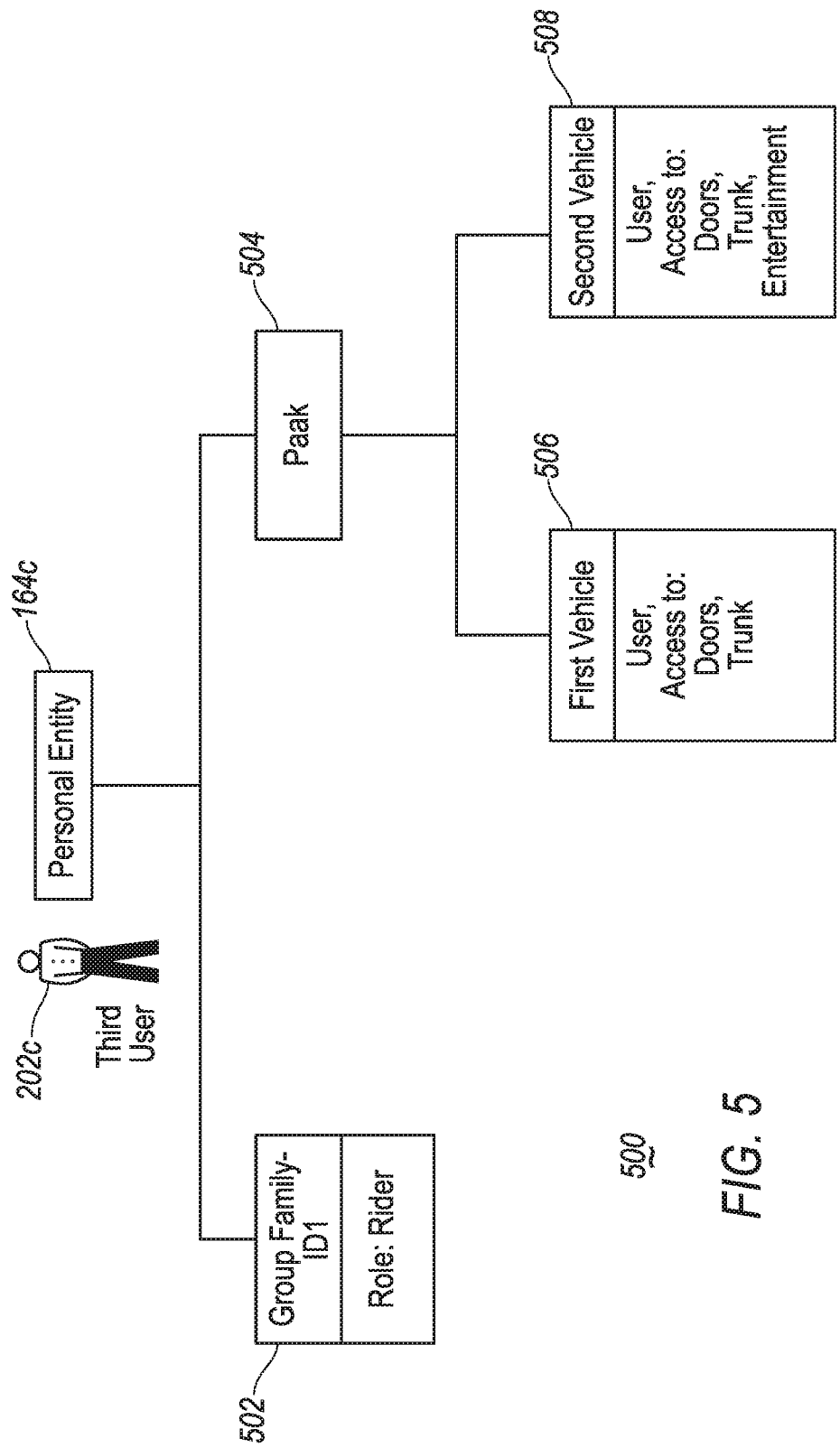
FIG. 5 illustrates a third example diagram for personal entity of one embodiment of the present disclosure.

Referring to FIG. 5, an example diagram 500 for a third personal entity of one embodiment of the present disclosure is illustrated. With continuing reference to FIGS. 1-4, the personal entity 164*c* of the third user 202*c* may be associated with have various entries. The personal entity 164*c* may be associated with a group entry 502 indicating Group Family—ID1, the same group as the first user 202*a* and the second user 202*b*. The personal entity 164*c* may be further associated with a PaaK entry 504 for the third user. Compared to the authority of the first and second user 202*a* and 202*b*, the third user 202*c* (e.g. the child) may have limited access to both vehicles 102. For instance, the third user 202*c* may have be a user for the first vehicle having limited access only to doors and the trunk. In other words, the third user 202*c* may be allowed to open and close doors and the trunk when he/she is alone with the first vehicle 102*a*. For the second vehicle, the third user 202*c* may have limited access to doors, the trunk and the entertainment system.

The embodiment illustrated with reference to FIGS. 2 to 5 may be applied to various examples. For instance, the three users 202 of Group Family—ID1 are a family of three sharing two vehicles 102. Within Group Family—ID1, each user 202 may have one or more associated roles. For instance, the first user 202*a* (e.g. the husband) may have the owner, driver and rider roles for both vehicles 102. The second user 202*b* (e.g. the wife) may have the driver and rider roles only. This means that the first user 202*a*, as the owner, may have the obligation to pay for both vehicles 102 or has paid the vehicles 102 in full. The third user 202*c* (e.g. the child, age 10) may have only the rider role, given his age.

Each user 202 may have a personal entity 164 associated with a list of NPEs 208. For instance, the NPEs may include the vehicles 102, the mobile devices 128, the PaaK 304 associated with a mobile device 128. Each personal entity 164 may have a profile storing information about the user 202 and a list of preferences/settings attached to the user. These preferences may allow the user easier manage customized experience by grouping together various settings for different vehicle capabilities and/or subscriptions. Each preference/setting may have a list of value or properties, depending on the capability and/or subscription. A separation may be imposed between different types of preferences. For instance, with reference to FIG. 3, the first user 202*a* may have one driver preference 312, but two entertainment preferences 314, 316. Grouping the driver preference 312 and the entertainment preferences 314, 316 separately may provide the advantage of keeping the same driving experience configured while easily changing switching between different entertainment options depending on the vehicle and/or the vehicle occupants. For instance, the first user 202*a* may prefer to listen to rock station music (e.g. the first entertainment preference 314) when he drives alone, but prefer to listen to classical music (e.g. the second entertainment preference 316) when he travels with the entire family. Furthermore, the separation between different types of preferences may enable loading the driving preference for one user and the entertainment preference for another user occupying the vehicle 102 as the same time. The vehicles 102 may be configured to identify each vehicle occupant via the mobile devices 128 associated with each user 202.

The entertainment preferences may be associated with third party subscriptions. Referring to FIG. 4, the second user 202*b* may have a satellite radio subscription 426 and a video streaming subscription 428. The second user 202*b* may configure the subscriptions 424 to share the satellite radio service 426 with all members of Group Family—ID1, i.e. the first user 202*a* and the third user 202*c*. For the video streaming service 428, the second user may choose to make the service available in the vehicle 102 only when she is present.

Furthermore, each user 202 of the Group Family—ID1 may be associated with a PaaK allowing the user to access and/or use the vehicles 102 using a mobile device 128 without requiring a physical key. Based on the owner role of the first user 202*a*, the first user 202*a* may have the administrator role associated to keys to both vehicles 102. The administrator role may give the first user 202*a* full access to both vehicles 102 and allow the first user 202*a* to issue other keys to other users and set the appropriate access level. Here, the first user 202*a* may be allowed to issue keys to users beyond Group Family—ID1. For the second user 202*b* with reference to FIG. 4, she may have different PaaK roles for different vehicles 102. For the second vehicle 102*b* which the second user primarily drivers, the second user 202*b* may have the administrator role allowing her to issue keys. For the first vehicle 102*a*, the second user 202*b* may be a user with full access, but not allowed to issue keys to other users. For the third user 202*c* with reference to FIG. 5, the child may be giving a restricted user PaaK, allowing him to access the doors and the trunk for both vehicle, and entertainment system only for the second vehicle 102*b*. The restricted user PaaK does not allow the third user 202*c* to drive/operate either of the vehicles 102 (e.g. start the engine, change gears or the like).

Figure 6:
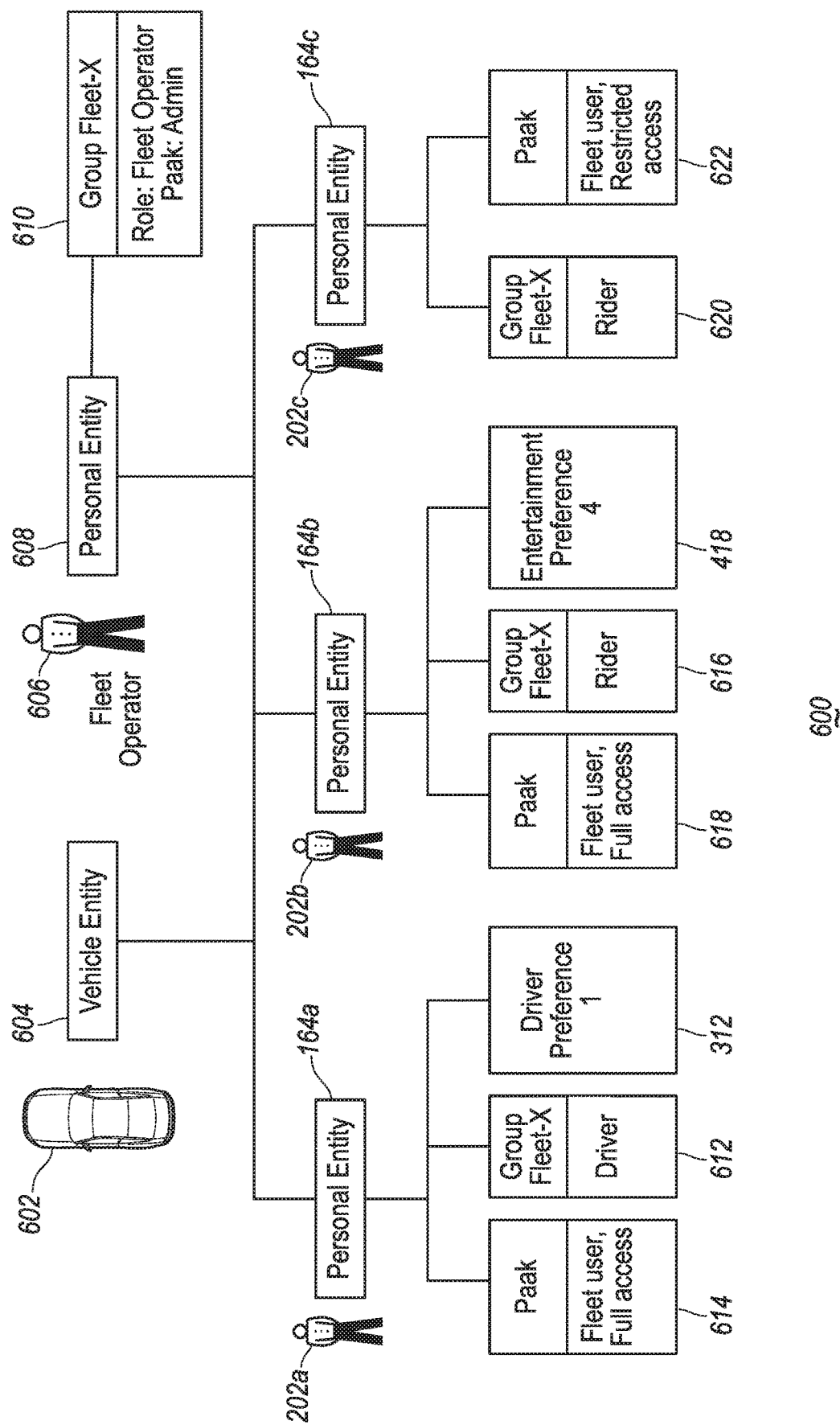
FIG. 6 illustrates an example schematic diagram of another embodiment of the present disclosure.

Referring to FIG. 6, an example schematic diagram of another embodiment of the present disclosure is illustrated. With continuing reference to FIGS. 1-5, in the present example, the family of three rents a vehicle 602 having a vehicle entity 604. The rental vehicle 602 is associated with a fleet operator 606 having the roles of fleet operator of Group Fleet X 610 and administrator for PaaK. With these roles, the fleet operator 606 may manage and control various settings of the rental vehicle 602 which may not be available for rental vehicle customers. For instance, the fleet operator 602 may manage the fleet location settings allowing the operator 602 to know the location of the vehicle 602. With the administrator PaaK role, the operator 602 may generate new keys and roles to other users.

In the present example, the first user 202*a* may be the driver of the Group Fleet—X 612 and assigned a fleet user PaaK 614 with full access to the rental vehicle 602. Responsive to the association between the vehicle entity and the personal entity 164*a*, the first driver preference 312 may be uploaded to the rental vehicle 602. The second user 202*b* may be a rider in the Group Fleet—X and given a fleet user PaaK 618 with full access to the rental vehicle 602. The second user may take over the entertainment system and upload her entertainment preference 418 after starting to use the vehicle 602. The third user 202c may be a rider of Group Fleet—X 620 and have a Paak with restricted access to the vehicle 602.

Figure 7:
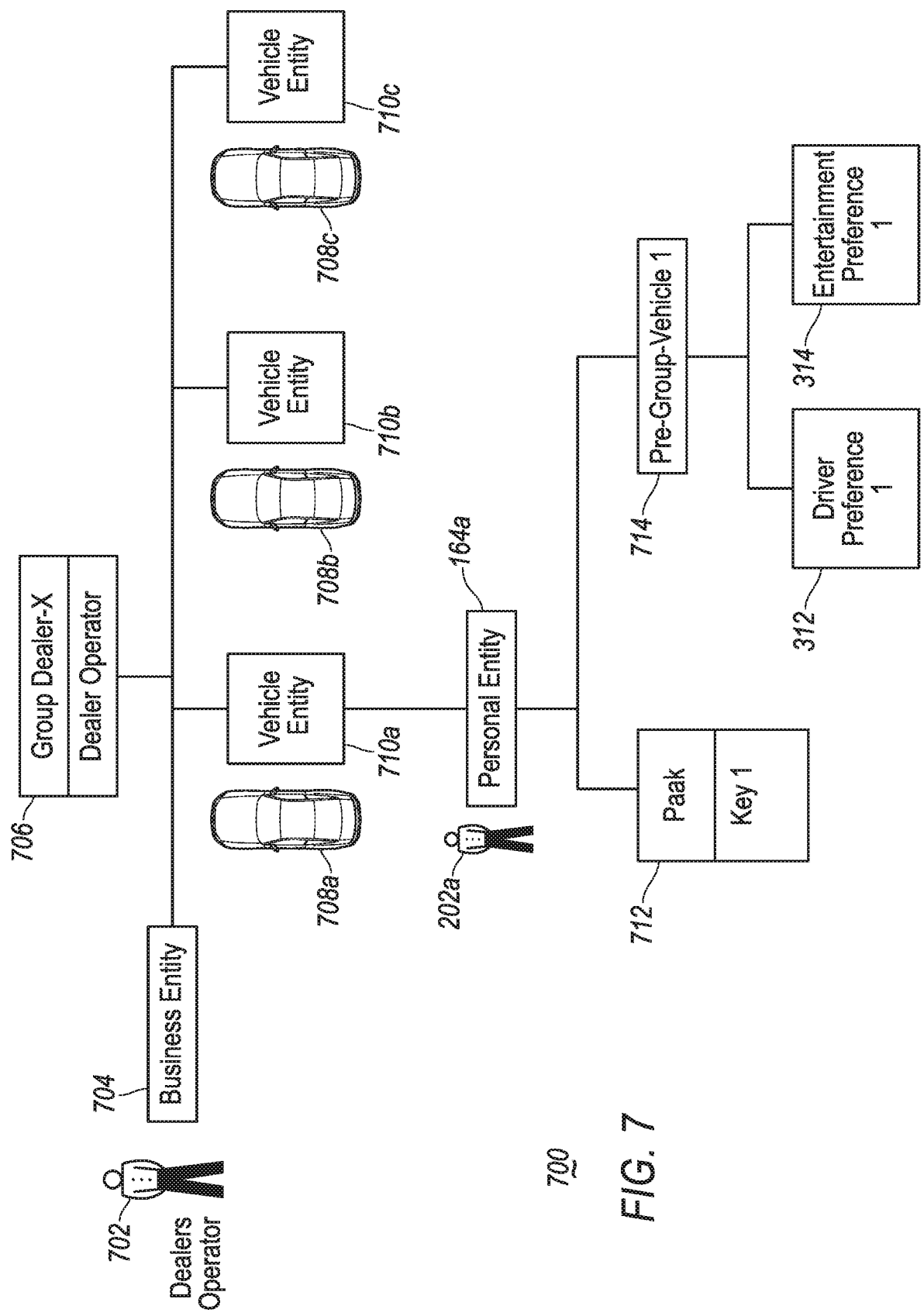
FIG. 7 illustrates an example schematic diagram of another embodiment of the present disclosure.

Referring to FIG. 7, an example schematic diagram 700 of another embodiment of the present disclosure is illustrated. In the present example, a dealer operator 702 may be a business entity 704 associated with Group Dealer—X. The operator 702 may place an order using order management application (not shown) for a number of vehicles 708 each having a vehicle entity 710 and suggest some preconfigured settings for the vehicles. The first user 202a may be a customer at the dealership. Using the personal entity 164a, the first user 202a may start to configure settings of the vehicles 708 before test driving the vehicles 708. For instance, the first user may be issued with a test drive PaaK 712 granting a limited time period to access the vehicle 708 (e.g. one hour). The personal entity 164a may be further associated with a preference group 714 having the first driver preference 312 and first entertainment preference 314 to upload to the test drive vehicle 708a.

Figure 8:
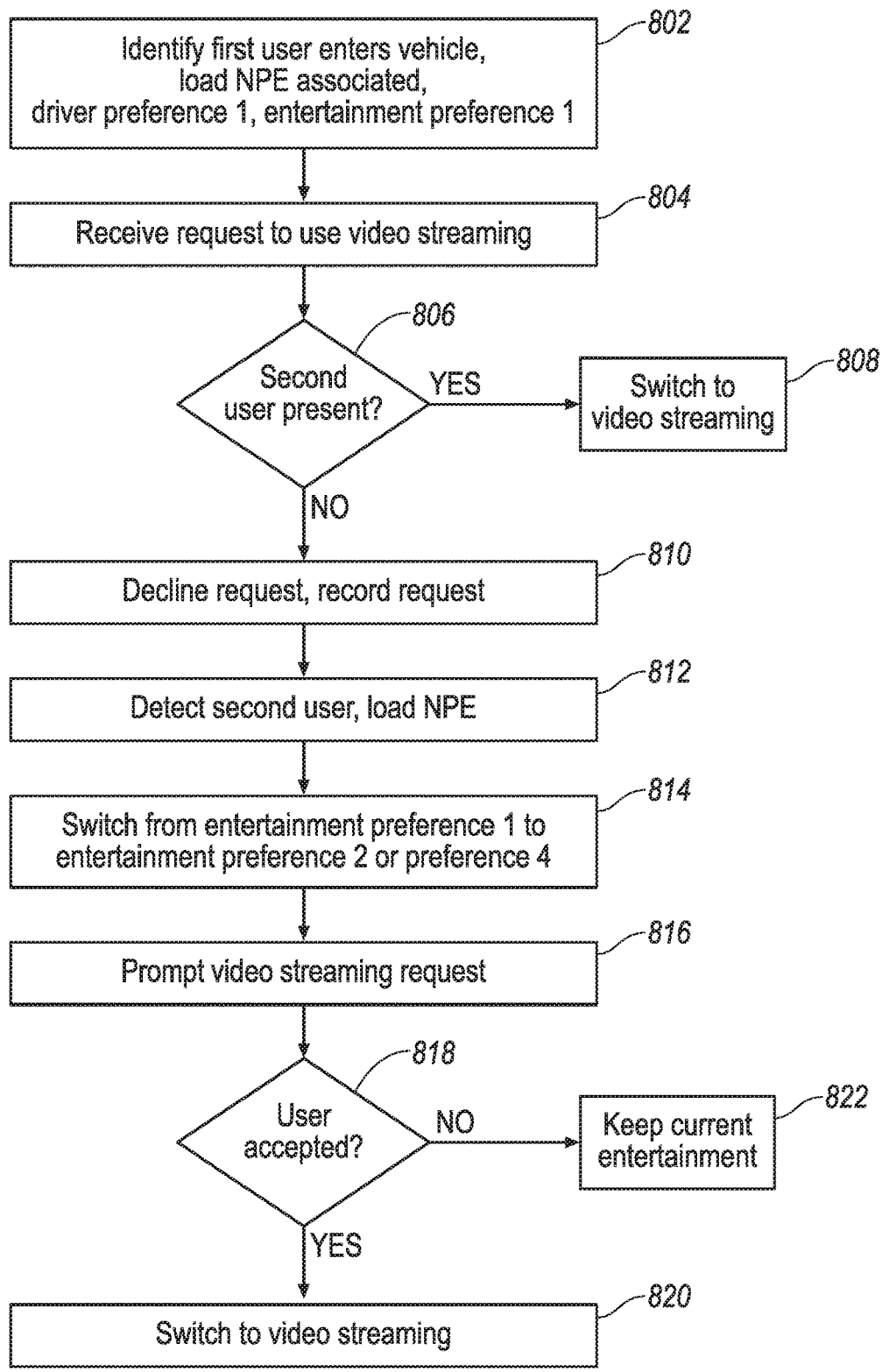
FIG. 8 illustrates an example flow diagram of one embodiment of the present disclosure.

Referring to FIG. 8, an example flow diagram for a process 800 of one embodiment of the present disclosure is illustrated. With continuing reference to FIGS. 1 to 7, at operation 802 the computing platform 104 identifies a first user 202a has entered the vehicle 102 via the mobile device 128 associated with the first user 202a. In response, the computing platform 104 load the NPEs 208a associated with the personal entity 164a of the first user 202a. The computing platform 104 may load the first driver preference 312 to provide a customized driving experience. Additionally, the computing platform 104 may load the first entertainment preference 312 as the first user 202a is currently the only user in the vehicle. At operation 804, the computing platform 104 receive a user request to load a subscription entertainment service 428, e.g. video streaming service. As discussed previously, the video streaming service 428 is subscribed by the second user 202b and may not be shared without the presence of the second user 202b in the same vehicle. At operation 806, the computing platform 104 detects if the second user 202b is present. If the second user 202b is detected, the process proceeds to operation 808 and the computing platform 104 switch to video streaming service. However, if the present example, the second user 202b is not yet present in the vehicle 102. Therefore, the process proceeds to operation 810 and the computing platform 104 declines the user request. Additionally, the computing platform 104 may record the user request for future reference.

At operation 812, the computing platform 104 detects the second user 202b has entered the vehicle 102 and load the NPEs 208b associated with the second user. The detection may be made via the mobile device 128 carried by the second user 202b. Alternatively, the computing platform 104 may be configured to identify the second user 202b via biometric means, such as facial recognition via a camera (not shown), fingerprint via a fingerprint sensor (not shown) or the like. Additionally or alternatively, the identification and authentication of the user may be performed by the second user 202b entering a password or personal identification number (PIN) through the HMI controls 112. Personal entity 164b and NPEs 208b of the second user may be stored in the storage 110 of the vehicle 102. Alternatively, the computing platform 104 may be configured to load the personal entity 164b and NPEs 208b from the cloud 172.

Responsive to detecting the second user 202b has entered the vehicle 102, at operation 814, the computing platform 104 switch the current entertainment setting from the first entertainment preference 314 (e.g. rock music) to the second entertainment preference 316 (e.g. classic music), as the first user 202a may not want to use the first entertainment preference 314 when other users are present. Alternatively, the computing platform 104 may switch to the fourth entertainment preference 418 of the second user 202b automatically or upon a user input. At operation 818, the computing platform 104 loads the user request for video streaming previously recorded and prompt the message via the HMI controls 112 to ask if the user still wants to switch to the video streaming service as now sharing condition has been met by the presence of the second user 202b. At operation 818, if the computing platform 104 receives a user confirmation, the process proceeds to operation 820 and to switch to video streaming service. Otherwise, the process proceeds to operation 822 and the computing platform 104 keeps the current entertainment settings unchanged.

Figure 9:
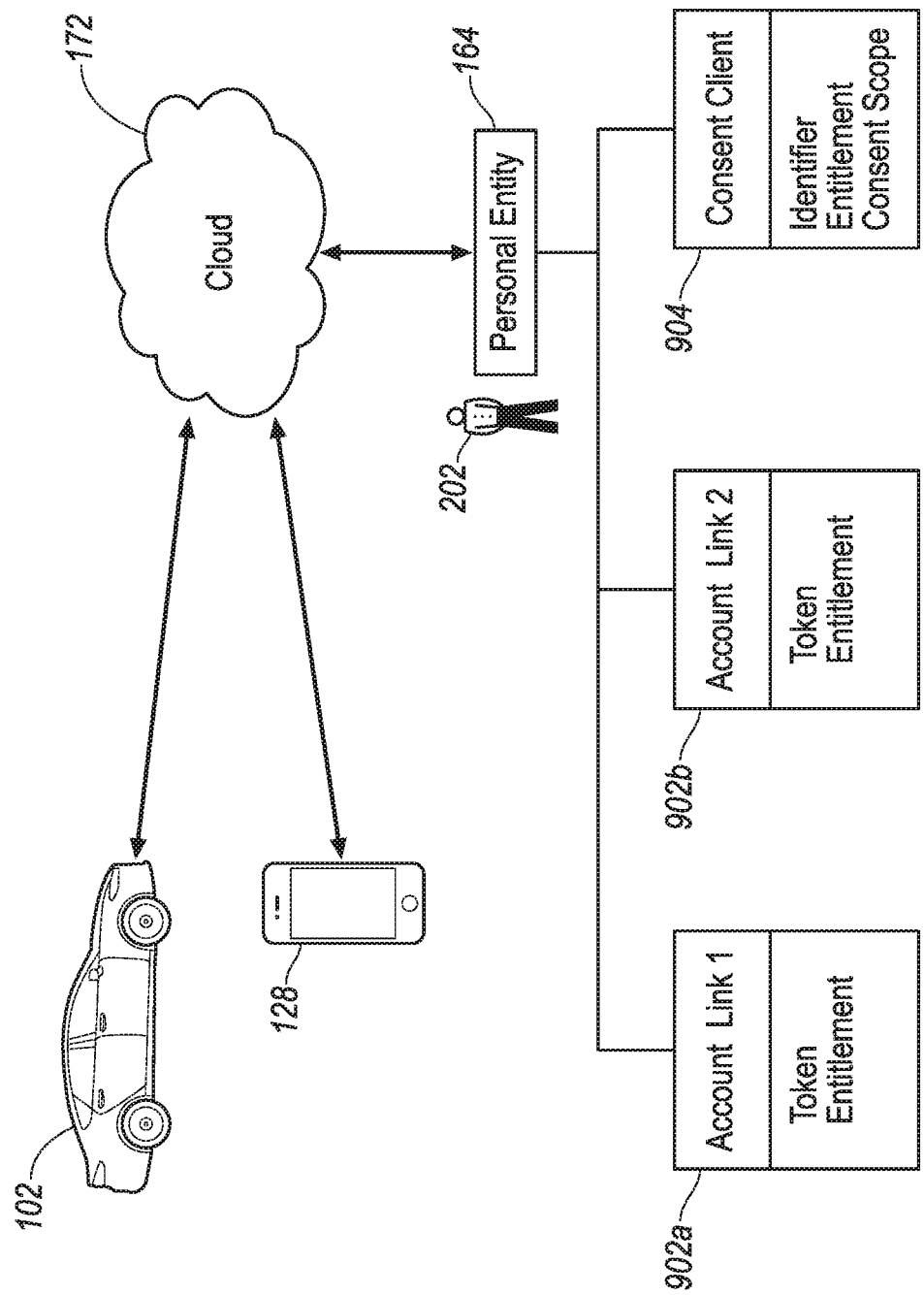
FIG. 9 illustrates an example schematic diagram of another embodiment of the present disclosure.

Referring to FIG. 9, an example schematic diagram 900 of another embodiment of the present disclosure is illustrated. In this example, one or more external service provider accounts (e.g. Outlook, Amazon, Netflix and etc.) are linked to the personal entity 164 of the user 202. The user 202 may use the mobile application 160 of the mobile device 128 to link the accounts in the cloud. Responsive to a success linking, the personal entity 164 may be associated with a first account link 902a and a second account link 902b. The account links 902 may have a token for authorization in the cloud 172 and an entitlement for services. With the token and entitlement, the HMI controls 112 of the vehicle 102 may automatically log into the respective accounts the user 202 which has identified him/herself to the vehicle 102. Additionally, a consent client 904 may be further associated with the personal entity 164 configured to allow the user 202 and/or other client exposing the display 114 to manage consent data and scope of settings.

Figure 10:
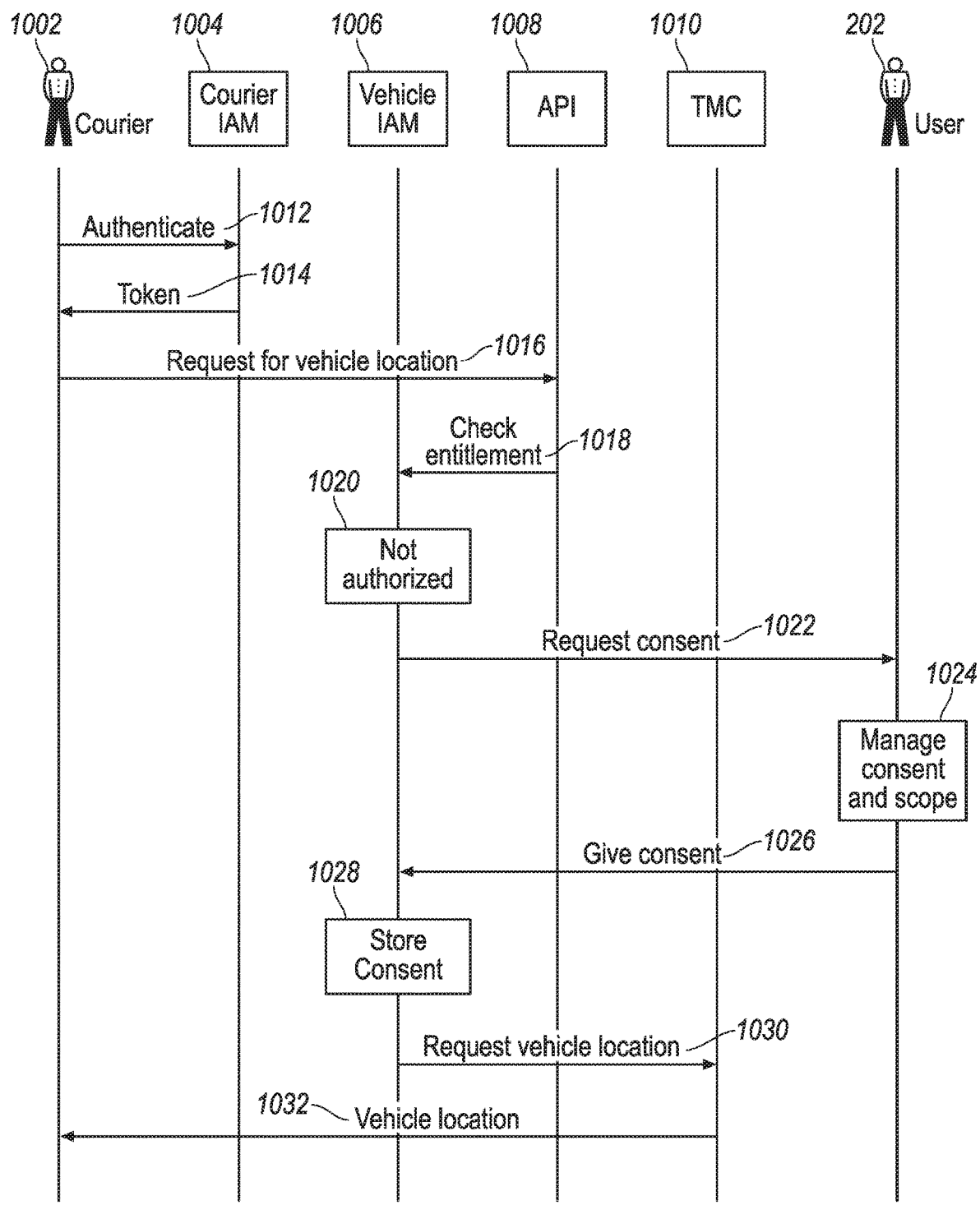
FIG. 10 illustrates an example data flow diagram of one embodiment of the present disclosure.

Referring to FIG. 10, an example data flow diagram for a consent request process 1000 of one embodiment of the present disclosure is illustrated. In this example, a courier 1002 may be a business partner of the vehicle user 202. The courier may request for accessing vehicle owner related information. For instance, the courier 1002 may be associated with a delivery-to-vehicle service and request for vehicle location to create a delivery route. The courier IAM system 1004 may be connected/federated with the vehicle IAM 1006 for data sharing. At operation 1012, the courier 1002 request to authenticate with the courier IAM 1004 (e.g. with a handheld device) to start the process. The courier IAM 1004 returns the courier 1002 with a token authorizing the process at operation 1014. At operation 1016, the courier 1002 sends a request for vehicle location to the application programming interface (API) 1008 of the vehicle IAM 1006. The API 1008 verifies the entitlement of the courier with the vehicle IAM 1006 at operation 1018, responsive to receiving the request. In the present example, however, the vehicle IAM 1006 verifies the authorization for the particular courier 1002 has not been granted at operation 920. In response, the vehicle IAM 1006 sends a request for consent to the user 202 at operation 1022. The request may be sent to the user 202 via various means. For instance, the request may be sent via email, text message, push notification or the like. Scope information may also be provided in the consent request. The scope may hold metadata such as number of times the request may be placed, validity period (e.g. temporary or permanent), or the like.

Responsive to receiving the request, the user 202 may choose to grant the consent with a scope (e.g. validity time period) via mobile application 160 or a web interface at operation 1024, and send the consent back to the vehicle IAM 1006 at operation 1026. At operation 1028, the vehicle IAM 1006 stores the consent including the scope (if provided), for any subsequent request of this type from the same business partner. At operation 1030, the vehicle IAM 1006 responds to the API 1008 to authorize the request and lets the API 1008 to reach the top management commitment (TMC) system to retrieve the vehicle location. At operation 1032, the vehicle location is sent to the courier 1002.

Figure 11:
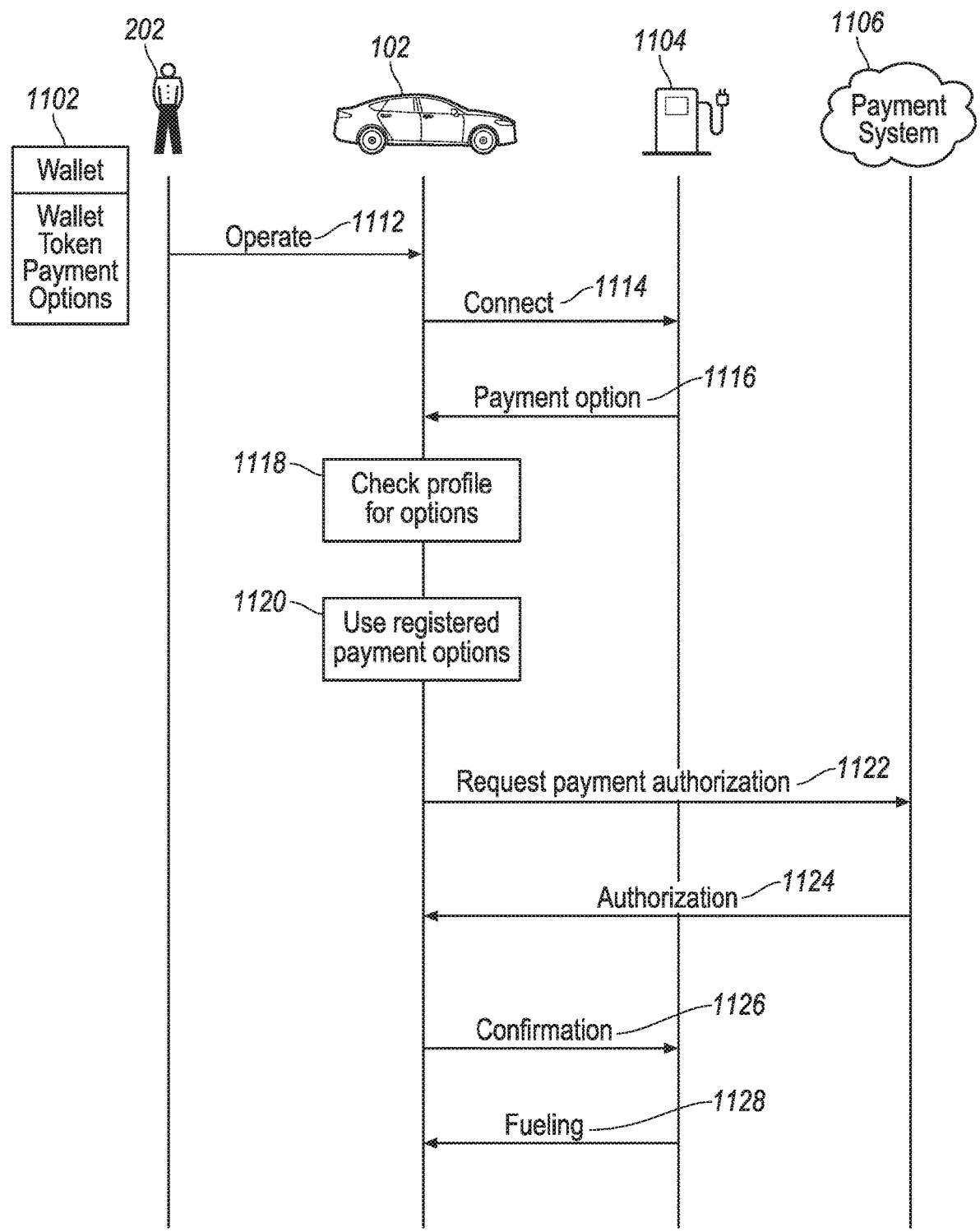
FIG. 11 illustrates an example data flow diagram of another embodiment of the present disclosure.

Referring to FIG. 11, an example data flow diagram for a vehicle fueling payment process 1100 of one embodiment of the present disclosure is illustrated. In the present example, the user 202 may be associated with a wallet entity 1102 (a.k.a. payment profile) created to secure credit card and/or banking information of the user 202. Tokens, identifiers, and payment options may be included in the wallet entity 1102. At operation 1112, the user 202 operates the vehicle 102 and the vehicle 102 has access to the wallet entity associated with the user 202. The vehicle 102 connects to a fueling station 1104 to start fueling at operation 1114. For instance, the fueling station 1104 may be a charging station to charge electric-powered vehicles. Additionally or alternatively, the fueling station 1104 may be a conventional fueling pump providing gasoline or diesel fuel. Responsive to detecting the vehicle 102 is connected, the fueling station 1104 requests for payment options form the vehicle 102 at operation 1116. At operation 1118, the computing platform 104 of the vehicle 102 verifies the user profile for payment options. More specifically, the computing platform 104 may load the wallet entity 1102 of the user 202 to check for payment options. Responsive to detecting the wallet entity 1102 and payment options, at operation 1120, the computing platform 104 uses the registered payment option to proceed with the transaction. At operation 1122, the vehicle 102 sends a request for payment authorization to a payment system 1106 in the cloud using payment information from the wallet entity 1102, and obtains the authorization at operation 1124. At operation 1126, the vehicle sends an authorization confirmation to the fueling station and starts fueling at operation 1128.

Figure 12:
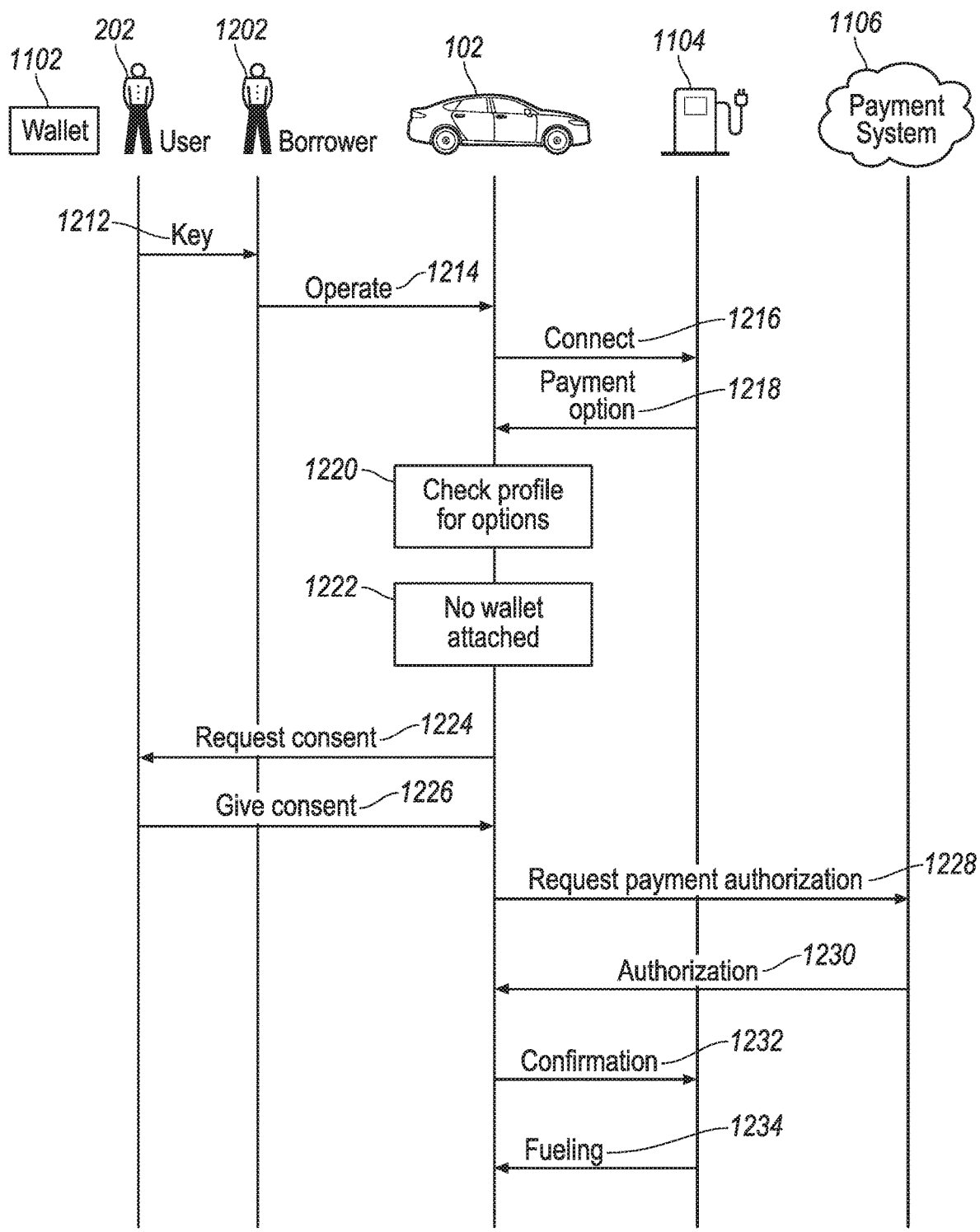
FIG. 12 illustrates an example data flow diagram of yet another embodiment of the present disclosure.

Referring to FIG. 12, an example data flow diagram for a vehicle fueling payment process 1200 of one embodiment of the present disclosure is illustrated. Compared with the example illustrated with reference to FIG. 11, the user 202 lends the vehicle 102 to a borrower 1202 in the present example. At operation 1212, the user 202 issues a key (e.g. PaaK) to the borrower granting him/her a permission to use the vehicle 102. As the borrower 1202 starts to operate the vehicle 102, operations 1214 to 1220 are substantially the same as operations 1112 to 1118 as illustrated with reference to FIG. 11. At operation 1222, the computing platform 104 identifies the borrower is using the vehicle 102 and no wallet entity 1102 is attached with the borrower 1202. Responsive to failing to detect a wallet, at operation 1224, the vehicle 102 sends a request for consent to the user 202 (e.g. the mobile device 128) to as permissions to use the wallet. At operation 1226, the user 202 grants the consent. The consent granted by the user 202 may include associated scope information, such as max amount, number of times, validity period or the like. Additionally, the scope information may further include limitations on purchase category. For instance, the user 202 may grant the consent to use the wallet 1102 to purchase fuel only, and decline any other category of purchases (e.g. road tolls). As an alternative example, the consent may be pre-issued with the key at operation 1212. In this case, the vehicle 102 may use the consent information associated with the borrower key to proceed with the transaction. Operations 1228 to 1234 are substantially the same as operations 1122 to 1128 and the description will be repeated here.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
    a controller, programmed to
        identify a first user using the vehicle;
        receive a request for payment option from a fueling station;
        search for a payment profile associated with the first user;
        detect the payment profile including one or more purchase categories;
        verify the one or more purchase categories include refueling;
        send a request for payment authorization to a cloud server;
        identify a second user using the vehicle while the first user is absent;
        fail to detect the payment profile associated with the second user;
        send a request for payment consent to a mobile device associated with the first user via a wireless network;
        receive the payment consent from the mobile device via the wireless network, wherein the payment consent specifies a scope of payment includes: a validity time period, and one or more purchase category authorized; and
        operate the vehicle to accept fuel supplied from the fueling station into the vehicle.

2. The vehicle of claim 1, wherein the controller is further programmed to:
    detect a digital key granted by the first user, and
    authorize the second user to operate the vehicle,
    wherein the digital key is attached with a payment consent.

3. The vehicle of claim 1, wherein the controller is further programmed to:
    responsive to receiving a payment authorization from the cloud server, send an authorization confirmation to the fueling station.

4. The vehicle of claim 1, wherein the fueling station is a charging station.

5. The vehicle of claim 1, wherein the purchase category includes a fueling category, and a toll payment category.

6. The vehicle of claim 1, wherein the payment consent further specifies a scope of payment including: a maximum total amount for transaction, and a maximum number of transaction times.

* * * * *